United States Patent [19]

Yoshida

[11] Patent Number: 4,566,123
[45] Date of Patent: Jan. 21, 1986

[54] STANDARD MEMORY TAKE IN METHOD

[76] Inventor: Hajime Yoshida, c/o Hajime Industries Ltd., Kudan Sanzen Bldg., 2-5-9, Kudanminami, Chiyoda-ku, Tokyo, Japan

[21] Appl. No.: 533,408

[22] Filed: Sep. 19, 1983

Related U.S. Application Data

[63] Continuation-in-part of Ser. No. 289,498, Aug. 3, 1981, abandoned.

[30] Foreign Application Priority Data

Oct. 4, 1978 [JP] Japan ................................ 53-122140

[51] Int. Cl.$^4$ ............................................... G06K 9/66
[52] U.S. Cl. ................................................... 382/15
[58] Field of Search .................................... 382/14, 15; 364/900 MS File

[56] References Cited

U.S. PATENT DOCUMENTS

| | | | |
|---|---|---|---|
| 2,992,413 | 7/1961 | Adams et al. | 364/900 |
| 3,325,787 | 6/1967 | Angell et al. | 382/14 |
| 3,333,248 | 7/1967 | Greenberg et al. | 382/14 |
| 3,351,917 | 11/1967 | Shimabukuro | 364/900 |
| 3,539,994 | 11/1970 | Clapper | 382/14 |
| 3,581,281 | 5/1971 | Martin et al. | 382/14 |

Primary Examiner—Leo H. Boudreau

[57] ABSTRACT

A standard memory take-in method for selecting a set of standard data for use with a pattern recognition system in which a plurality of samples of data representing a single known object to be recognized and stored as a set of standard data are stored, the plurality of samples being compared with data representing a subsequent sample to decide whether or not the subsequent sample belonging to the single known object should be stored.

4 Claims, 6 Drawing Figures

STANDARD MEMORY TAKE IN METHOD

The present application is a continuation-in-part of co-pending U.S. patent application Ser. No. 289,498 filed Aug. 3, 1981, abandoned concurrent with the filing hereof.

BACKGROUND OF THE INVENTION

1. Field of the Invention

The present invention relates generally to a standard memory data take in method, and is directed more particularly to a method of standard memory data take in which provides an efficient utilization of the memory area which is effective as a library for use with pattern recognition systems.

2. Description of the Prior Art

In the prior art of pattern recognition systems, there are the types that determine whether, for example, a subject pattern X to be judged belongs to group A' or not by using a photo-electric conversion device such as a television camera or the like. With such type of recognition systems, among the subject patterns that belong to the group A', a proper number of typical pattern data a1, a2, ... are selected and then memorized. For the pattern data a certain threshold value is separately designated. When the difference between the data of the subject pattern X to be recognized and any one of the memory data a1, a2, ... is found to be within the above threshold value, the subject pattern X is judged as the same pattern as an already established memory, in other words, judgement is made that it belongs to group A'.

One important matter for such pattern recognition systems of prior art lies in how effectively the memory area is used or not. In other words, since the area for memorizing the data is limited, the reliability of judgement is greatly influenced by the proper selection of samples whose data are adopted as standard memories and whether the threshold value upon the pattern recognition is adequately established or not. For instance, as shown on FIG. 1, when the distribution range of patterns in group A' has a shape as illustrated at A1 and the distribution of the pattern data a1, a2 ... of group A' to be memorized is eccentrically located in relation with the shape A1 of the actual pattern distribution range shown on the same drawings, the ranges that are judged to "belong to group A'" by the memorized datas a1, a2, ... and the threshold value (which in this case is illustrated by the radius at each point data a1, a2, ...) tend to become a narrower range than the true range.

In general practice, a number of samples that are known to belong to group A' and transported by a belt conveyer or the like as an example, are either taken in as memories by a process as illustrated on FIG. 2, or to be little more thorough by the human visual sight selection, an overall sampling to represent group A' is conducted and then memorized. However, when the number of samples that belong to group A' and are transported by a conveyer or the like are sequentially memorized, even though the samples are very similar to those already taken in as the standard memories, they are sequentailly taken in as standard memories. Further, even though it is desired that the samples to be memorized are sampled by human judgement, the human selection or judgement is not necessarily quantitative and is greatly influenced by the feeling at each time and a different sampling can be conducted by a different person, it therefore lacks in true reliability. As a result, closely similar patterns can be taken in as memory, such as illustrated as a1 and a2, a4 and a5 in FIG. 3, and it is often experienced that the memory area is not effectively used.

In order to overcome such defect, it is enough that a mass of pattern memory data may be taken in, but in actuality, the memory area is limited as above mentioned. Accordingly, in order to cover the distribution range of group A' with a limited memory area, it is necessary that the pattern memory data are selected suitably to sample the pattern data from the overall portion of the distribution range of group A'.

OBJECTS AND SUMMARY OF THE INVENTION

Accordingly, an object of the present invention is to provide a novel standard memory take in method.

Another object of the invention is to provide a standard memory take in method whereas rather than depending upon manual judgement for selection of samples to be taken in as memory, an automatic memory selection function is provided.

According to an aspect of the present invention there is provided a standard memory take in method for selecting a set of standard data for use with a pattern recognition system in which a plurality of samples of data representing a single known object to be recognized and stored as a set of standard data are stored, said plurality of samples being compared with data representing a subsequent sample to decide whether or not said subsequent sample belonging to said single known object should be stored, said standard memory take-in method comprising the steps of:

a. storing a first coming sample of data representing said object in a memory unconditionally as a standard data;

b. setting a predetermined threshold value which is used to determine whether or not a second coming sample of data is stored as a standard data;

c. taking in the second coming sample of data;

d. calculating a difference between said first coming sample of data and a second coming sample of data;

e. storing said second coming sample of data in said memory only if said difference exceeds the predetermined threshold value and refusing to store said second coming sample of data in said memory if said difference is less than said predetermined threshold value;

f. calculating differences between each subsequent sample of data and each sample of data previously stored in said memory;

g. storing each subsequent sample of data in said memory only if all of said differences exceed the predetermined threshold value and refusing to store said subsequent sample of data in said memory if any of said differences is less than said predetermined threshold value;

h. checking whether said memory is fulfilled or not; and i. repeating said steps c to g when said memory is not fulfilled to fulfil said memory.

The other objects, features and advantages of the present invention will become apparent from the following description taken in conjunction with the accompanying drawings through which the like references designate the same elements and parts.

DESCRIPTION OF THE PREFERRED EMBODIMENTS

Figure 1:
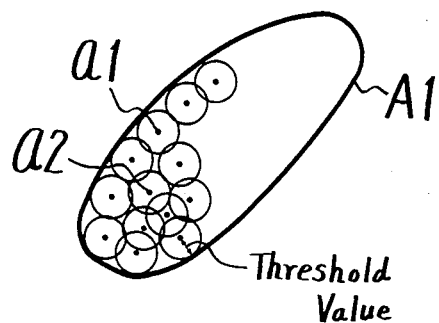
FIG. 1 shows a schematic diagram which indicates the distribution of pattern data within the memory area.
Figure 2:
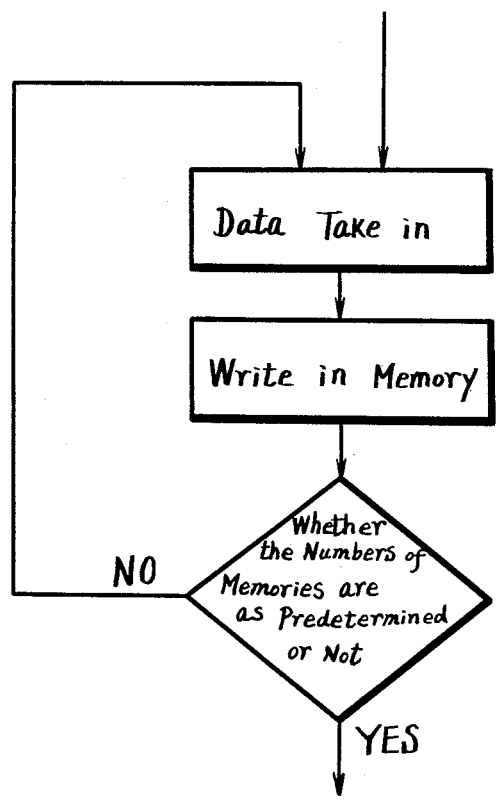
FIG. 2 is a schematic chart showing a sample take in method under prior arts.
Figure 3:
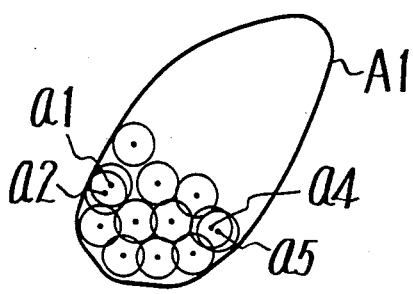
FIG. 3 is a schematic diagram showing the pattern data within the memory area in order to explain the data take in method under prior arts.
Figure 4:
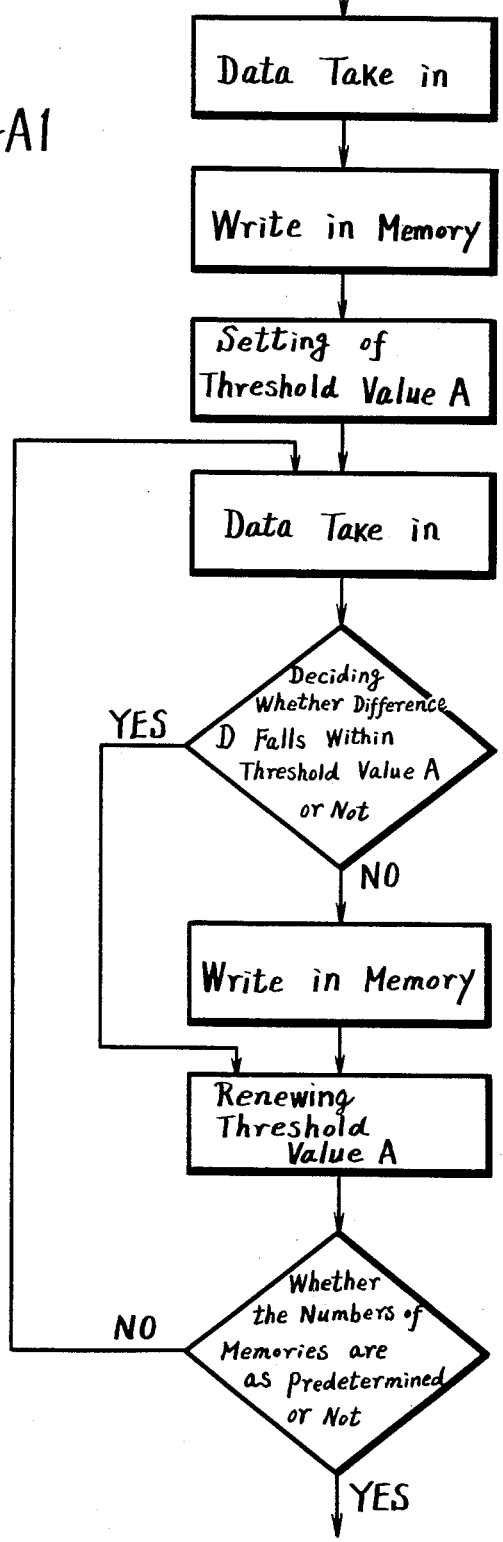
FIG. 4 is a schematic chart showing an example of the standard memory data take in method according to the present invention.

An example of the pattern data taken in method according to the present invention will be explained in reference with FIG. 4 hereunder. In this example of the invention, as shown on the chart of FIG. 4, the data of a first coming sample is taken in unconditionally as a standard memory a1 for instance. Then, a threshold value A is set at a given large value which is used to determine whether the following sample to the first sample is taken in as, for example, a standard memory a2 or not. As the next step, the following samples are taken in and it is calculated whether data difference D between the data of the following samples and the data of the samples which are already taken in is within the above mentioned predetermined threshold value A. Then, when such difference D is larger than the threshold value A, the data of the above mentioned following samples are adopted as standard memory data and memorized. However, when the difference D is smaller than or fallen within the threshold value A, the data of the above mentioned following samples are not adopted as standard memory data.

When the aforementioned threshold value A is set too large, it becomes impossible to take in the necessary data and hence it also becomes impossible to gaplessly fulfil the pattern distribution range. Therefore, in such case, as an example, the difference between the data of a memory candidate that already has been decided not to be adopted and the data of the standard memory that has been taken as the standard memory is sought, and a value which is smaller than this difference value is subtracted from the threshold value A to perform the calculation to renew the threshold value A. Then, the data taken in of a predetermined number is carried out under this renewed threshold value. Further, as a means of renewal calculations of this threshold value, there may be considered some calculations. For example, when the number of consecutively non-taken in data does not exceed a certain given number, the threshold value A is renewed by the similar process as above mentioned, or for instance, the difference between the average value of the memory candidate data group that already have been determined as nonadopted and the standard memory data that have been adopted as the standard memory is calculated and then this difference value is subtracted from the threshold value A to renew the threshold value or the like.

As a further step, a check is made to determine whether the memory area is full with memory data or not. When the memory area is not full, the data of samples are processed by the manner similar to that above mentioned and then taken in. By repetition of data processing in such manner, the taken in of the samples whose data are close to the already adopted memory data, in other words, samples which are not so effective as samples are rejected and only those data of samples which are not similar to the data of samples which are already taken are adopted as memory data so that in the limited memory area, only those memory data which have an adequate distance between memory data are taken in which provides an effect that allows a highly efficient use of the memory area.

Figures 5, 6:
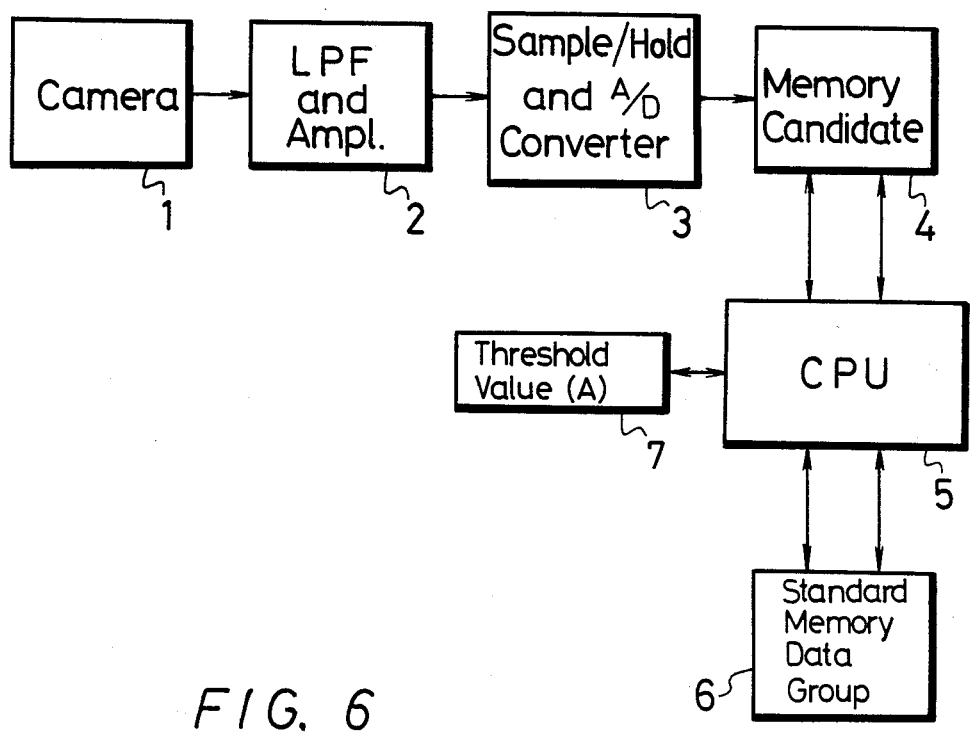
FIG. 5 is a block diagram showing an example of the apparatus according to the invention.
FIG. 6 is a diagram showing an example of the pick-up screen of the camera used in FIG. 5.

Next, one example of an apparatus that places the above mentioned method into practice will be explained in reference with FIG. 5 and FIG. 6. FIG. 5 shows an example in which the image of pattern to be recognized is caught optically and then the pattern is judged and to which the present invention is applied. In FIG. 5, 1 designates a sensor which photo-electric converts an object (pattern) to be recognized such as a CCTV (closed circuit television) camera, a matrix array camera or the like. In this case the photosensing area or pick-up screen of the camera 1 is divided into, for example, a plurality of picture elements. The object (pattern) that is projected onto each of the picture elements of the picture screen of camera 1 is photoelectrically converted to provide a video signal which is then supplied to a low pass filter and amplifier 2. This low pass filter and amplifier 2 removes noise and unnecessary high frequency contents from the input video signal and then amplifies the input video signal. Such amplified video signal is supplied to a sample-hold and A/D converter 3. At here, the video signal is converted into digital data and is sent to a memory means 4, where it is temporarily stored. The data that is stored at this memory means 4 is a standard memory data candidate, and when the data satisfies the above mentioned conditions, the data is supplied as the standard memory data group to a standard memory means 6 through a CPU (central processing unit) 5. In other words, if the difference D between this standard memory data candidate and the standard memory data that are stored already at standard memory means 6 is smaller than the threshold value A that is predetermined by and stored at, for example, a memory means 7 or the like, it is judged by the CPU 5 that this new standard memory data candidate and the already stored standard memory data indicate such patterns that are very similar to each other and hence the new standard memory data candidate is not adopted as a standard memory. Thus, this standard memory data candidate is not supplied to the standard memory means 6. On the contrary, when the aforementioned data difference D is larger than the threshold value A, the CPU 5 judges to adopt the standard memory data candidate as a standard memory data and supplies the same to the standard memory means 6 to be stored therein.

At this time, based on the difference D between the standard memory data candidate which is already decided, for example, not to be adopted and the standard memory data already adopted as a standard memory data, the threshold value A is renewed by the CPU 5.

Next, the above will be described in detail with reference to FIG. 6 which shows one example of the pick-up screen of camera 1. In the example on FIG. 6 a pickup screen 10 of camera 1 is divided into 16 sensor or picture elements P1, P2, ... P16. Now it is assumed that the data of the pattern which is to become the first standard memory data and corresponds to each picture element P1 ... P16 of the picture screen 10 of camera 1 are taken as $a_1^1 \ldots a_1^{16}$. In the same respect, the data of the standard memory data candidate which correspond to each picture element P1 ... P16 are taken as $a_2^1 \ldots a_2^{16}$. Now, the difference D between both of the memory data such as between $a_1^1$ and $a_2^1$; $a_1^2$ and $a_2^2$; ... $a_1^{16}$ and $a_2^{16}$ is compared with the threshold value A at CPU 5, by which a decision as aforementioned as to whether or not the standard memory data candidate will be adopted as the standard memory group or not is made.

Further, the example illustrated on FIG. 6 is merely a case where the pick-up screen 10 of the camera 1 is divided into 16 picture elements and the data from each picture element is compared. However, it is obviously apparent that the concepts of the present invention may be applied to cases that utilize datarizing methods otherwise.

The above description is given on a single preferred embodiment of the invention, but it will be apparent that many modifications and variations could be effected by one skilled in the art without departing from the spirits or scope of the novel concepts of the invention, so that the scope of the invention should be determined by the appended claims only.

I claim as my invention:

1. A standard memory take-in method for selecting a set of standard data for use with a pattern recognition system in which a plurality of samples of data representing a single known object to be recognized and stored as a set of standard data are stored, said plurality of samples being compared with data representing a subsequent sample to decide whether or not said subsequent sample belonging to said single known object should be stored, said standard memory take-in method comprising the steps of:

a. storing a first coming sample of data representing said object in a memory unconditionally as a standard data;

b. setting a predetermined threshold value which is used to determine whether or not a second coming sample of data is stored as a standard data;

c. taking in said second coming sample of data;

d. calculating a difference between said first coming sample of data and said second coming sample of data;

e. storing said second coming sample of data in said memory only if said difference exceeds said predetermined threshold value and refusing to store said second coming sample of data in said memory if said difference is less than said predetermined threshold value;

f. calculating differences between each subsequent sample of data and each sample of data previously stored in said memory;

g. storing each subsequent sample of data in said memory only if all of said differences exceed said predetermined threshold value and refusing to store said subsequent sample of data in said memory if any of said differences is less than said predetermined threshold value;

h. checking whether said memory is fulfilled or not; and i. repeating said steps c to g when said memory is not fulfilled to fulfil said memory.

2. A method according to claim 1 further comprising the step of:

calculating a difference between data of samples which are not stored in said memory and data already stored in said memory; and renewing said threshold value based on said third-mentioned difference.

3. A method as claimed in claim 2, wherein said threshold value renewing step is carried out by subtracting a value smaller than said third-mentioned difference from said threshold value.

4. A method according to claim 1 further comprising the steps of:

calculating a mean value of data group which are not stored;

calculating a difference between said mean value and data already stored in said memory; and renewing said threshold value by subtracting said third-mentioned difference from said threshold value.

* * * * *